US011042132B2

(12) United States Patent
Fan et al.

(10) Patent No.: US 11,042,132 B2
(45) Date of Patent: Jun. 22, 2021

(54) TRANSFORMATIVE REMEDIAL ACTION SCHEME TOOL (TRAST)

(71) Applicant: Battelle Memorial Institute, Richland, WA (US)

(72) Inventors: Xiaoyuan Fan, Richland, WA (US); Xinya Li, Richland, WA (US); Emily L. Barrett, Richland, WA (US); Qiuhua Huang, Richland, WA (US); James G. O'Brien, Richland, WA (US); Renke Huang, Richland, WA (US); Zhangshuan Hou, Richland, WA (US); Ruisheng Diao, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 138 days.

(21) Appl. No.: 16/435,352

(22) Filed: Jun. 7, 2019

(65) Prior Publication Data
US 2020/0387121 A1    Dec. 10, 2020

(51) Int. Cl.
*G05B 13/04*    (2006.01)
*G05B 13/02*    (2006.01)
(Continued)

(52) U.S. Cl.
CPC ....... *G05B 13/042* (2013.01); *G05B 13/0265* (2013.01); *G06Q 40/04* (2013.01); *H02J 3/008* (2013.01); *H02J 3/24* (2013.01)

(58) Field of Classification Search
None
See application file for complete search history.

(56) References Cited

U.S. PATENT DOCUMENTS

| 7,840,395 | B2 * | 11/2010 | Nasle | G06F 30/20 |
| | | | | 703/18 |
| 8,126,685 | B2 * | 2/2012 | Nasle | G05B 17/02 |
| | | | | 703/4 |

(Continued)

OTHER PUBLICATIONS

J O'Brien, R Huang, E Barrett, Q Huang, X Fan, and R Diao, "Adaptive RAS/SPS System Settings for Improving Grid Reliability and Asset Utilization through Predictive Simulation and Controls", Oct. 2017, U.S. Department of Energy under Contract DE-AC05-76RL01. (Year: 2017).*

(Continued)

*Primary Examiner* — Mohammad Ali
*Assistant Examiner* — Kelvin Booker
(74) *Attorney, Agent, or Firm* — Colby Nipper PLLC

(57) ABSTRACT

Techniques and apparatuses are described that enable transformative Remedial Action Scheme (RAS) analyses and methodologies for a bulk electric power system, including methods of designing, reviewing, revising, testing, implementing, verifying, or validating a RAS. An improved RAS improves operation of the power system, including performance, reliability, control, and asset utilization. The example methodologies discussed—also referred to as a transformative Remedial Action Scheme tool (TRAST)— provide an end-to-end solution for adaptively setting RAS parameters based on realistic and near real-time operation conditions to improve power grid reliability and grid asset utilization, by leveraging utility data analysis and employing dynamic simulations and machine learning to significantly simplify and shorten the entire RAS process.

20 Claims, 15 Drawing Sheets

(51) Int. Cl.
*H02J 3/24* (2006.01)
*G06Q 40/04* (2012.01)
*H02J 3/00* (2006.01)

(56) References Cited

U.S. PATENT DOCUMENTS

| | | | | |
|---|---|---|---|---|
| 9,031,824 | B2* | 5/2015 | Nasle | G05B 13/048 |
| | | | | 703/13 |
| 2002/0103745 | A1* | 8/2002 | Lof | H02J 3/381 |
| | | | | 705/37 |
| 2005/0033481 | A1* | 2/2005 | Budhraja | H02J 3/008 |
| | | | | 700/286 |
| 2012/0022713 | A1* | 1/2012 | Deaver, Sr. | G05B 17/02 |
| | | | | 700/298 |
| 2012/0296482 | A1* | 11/2012 | Steven | G06F 17/10 |
| | | | | 700/291 |
| 2012/0316688 | A1* | 12/2012 | Boardman | H02J 13/00028 |
| | | | | 700/291 |
| 2013/0253898 | A1* | 9/2013 | Meagher | G06N 20/00 |
| | | | | 703/18 |
| 2014/0277788 | A1* | 9/2014 | Forbes, Jr. | G06Q 50/06 |
| | | | | 700/286 |
| 2014/0304025 | A1* | 10/2014 | Steven | H02J 3/008 |
| | | | | 705/7.24 |
| 2019/0219293 | A1* | 7/2019 | Wenzel | G06Q 30/0283 |
| 2019/0380091 | A1* | 12/2019 | Li | H02J 13/00028 |
| 2020/0106273 | A1* | 4/2020 | Duan | G05B 13/042 |
| 2020/0327264 | A1* | 10/2020 | Wang | H02J 3/008 |
| 2020/0387121 | A1* | 12/2020 | Fan | G05B 13/042 |

OTHER PUBLICATIONS

NERC, "Special Protection Systems (SPS) and Remedial Action Schemes (RAS): Assessment of Definition, Regional Practices, and Application of Related Standards Revision 0.1", Apr. 2013. (Year: 2013).*
NERC, ""Remedial Action Scheme" Definition Development Background and Frequently Asked Questions Project 2010-05.2—Special Protection Systems", Oct. 2014. (Year: 2014).*
Xiaoyuan Fan, "Empowering Data Model Convergence in Power System Planning Study & Control Design by Machine Learning with Utility Data", May 2019, PNNL and U.S. Department of Energy. (Year: 2019).*
J. J. Chromik, A. Remke, and B. R. Haverkort, "An integrated testbed for locally monitoring SCADA systems in smart grids", Chromik et al. Energy Informatics (2018) 1:56. (Year: 2018).*
James D. Weber, "Basic RAS Modeling Demonstration in PowerWorld Simulator", May 2013. (Year: 2013).*
Wang et al., "Smart RAS (Remedial Action Scheme)", 2010, IEEE. (Year: 2010).*
Ramanathan et al., "BPA's Experience of Implementing Remedial Action Schemes in Power Flow for Operation Studies", 2013, IEEE. (Year: 2013).*
Hossain-McKenzie et al., "Analytic corrective control selection for online remedial action scheme design in a cyber adversarial environment", Jan. 2017, IET Cyber-Physical Systems: Theory & Applications, IET Journals. (Year: 2017).*
Khaledian et al., "Power Grid Security Improvement by Remedial Action Schemes Using Vulnerability Assessment Based on Fault Chains and Power Flow", Jun. 2018, 2018 IEEE International Conference on Probabilistic Methods Applied to Power Systems (PMAPS). (Year: 2018).*
Flores et al., "An Approach Based on Remedial Action Scheme to Increase Resiliency Under Failures in the Central American Power Grid", 2017, 2017 IEEE PES Innovative Smart Grid Technologies Conference. (Year: 2017).*
Fan X., R. Huang, Q. Huang, X. Li, E.L. Barrett, J.G. O'Brien, and Z. Hou, et al. "Adaptive RAS/SPS System Setting for Improving Grid Reliability and Asset Utilization through Predictive Simulation and Controls: A Use Case for Transformative Remedial Action Scheme Tool (TRAST): Jim Bridger RAS Evaluation and Analysis," Dec. 2019, 38 pages.
Fan, "Empowering Data Model Convergence in Power System Planning Study & Control Design by Machine Learning with Utility Data", May 30, 2019, 23 pages.
Fan, "Utility Data Analysis and Exploration for Power System Control Applications," Oct. 2018, 17 pages.
Fan, "Machine Learning Methods for RAS Design and Calculation in the Transformative RAS Tool (TRAST)," Nov. 30, 2018, 30 pages.

* cited by examiner

TRANSFORMATIVE REMEDIAL ACTION SCHEME TOOL (TRAST)

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND

The Federal Energy Regulatory Commission (FERC) regulates the interstate transmission of electricity, often deployed in bulk transmission or grid power systems (bulk electric systems, or BES). In cooperation with the North American Electric Reliability Corporation (NERC), in 2017 FERC approved the definition of a Remedial Action Scheme (RAS) for such power systems as: "A scheme designed to detect predetermined System conditions and automatically take corrective actions that may include, but are not limited to, adjusting or tripping generation (MW and Mvar), tripping load, or reconfiguring a System(s). RAS accomplish objectives such as:

Meet requirements identified in the NERC Reliability Standards;
Maintain Bulk Electric System (BES) stability;
Maintain acceptable BES voltages;
Maintain acceptable BES power flows;
Limit the impact of Cascading or extreme events."

Simply stated, RAS provide automatic mitigation of performance violations on power systems or, in other words, automatic mitigation actions for sensed contingencies without operator intervention. RAS, sometimes referred to or used interchangeably with the term Special Protection Schemes (SPS), are used throughout the bulk transmission system as a non-wires method of increasing transmission transfer capability. RAS supplement ordinary protection and control devices (fault protection, reclosing, AVR, PSS, governors, AGC, etc.) to prevent violations of reliability standards. RAS sense abnormal system conditions and take pre-determined or pre-designed action to prevent those conditions from escalating into major system disturbances. RAS actions may minimize equipment damage, cascading outages, uncontrolled loss of generation, and interruptions of customer electric service. While most RAS protect for different things, their impacts may vary and range from the violation of thermal limitations to transient stability issues.

As noted in the 2017 Remedial Action Scheme Design Guide by the Western Electricity Coordinating Council (WECC) Relay Work Group, RAS detect predetermined System conditions and automatically take corrective actions via simple control principles such as event-based, parameter-based, response-based, or a combination of these. As quoted:

"Event-based schemes directly detect outages and/or fault events and initiate actions such as generator/load tripping to fully or partially mitigate the event impact. This open-loop type of control is commonly used for preventing system instabilities when necessary remedial actions need to be applied as quickly as possible."

"Parameter-based schemes measure variables for which a significant change confirms the occurrence of a critical event. This is also a form of open-loop control but with indirect event detection. The indirect method is mainly used to detect remote switching of breakers (e.g. an opposite end of a line) and significant sudden changes which can cause instabilities, but may not be readily detected directly. To provide timely remedial action execution, the measured variables may include power, angles, etc., and/or their derivatives."

"Most event- and parameter-based schemes are triggered by a combination of events and parameters. These schemes initiate pre-planned actions based on studies of pre-defined system contingencies for a variety of conditions."

"Response-based schemes monitor system response during disturbances and incorporate a closed-loop process to react to actual system conditions. Response-based scheme action may be more finely calibrated to the magnitude of the disturbance, but usually is not fast enough to prevent instabilities following severe disturbances. Some equipment unloading schemes could be interpreted as response-based closed-loop schemes. A response-based scheme can be used when gradual (e.g. step-by-step) increase of remedial action is acceptable."

Critical details of RAS design and operating include:
"Arming Criteria: Critical system conditions for which a step-wise RAS should be ready to take action when required.

Initiating Conditions: The critical contingencies to initiate action if the scheme is armed. Parameter-based RAS detect changes in critical system conditions rather than directly detecting specific conditions.

Action Taken: The minimum remedial action required for each contingency (when armed) and the maximum acceptable remedial action for each contingency (when pertinent).

Time Requirements or Allowable Time: The maximum time allowable for the remedial action to be accomplished."

Besides RAS, other power control systems, such as Energy Management System (EMS), Supervisory Control and Data Acquisition (SCADA), or Distribution Control System (DCS), support and enable grid operations by issuing control commands mostly to geographically distributed power system devices. In this normal application, these systems are not considered to be RAS. However, if these systems are configured to detect predetermined conditions and take corrective actions consistent with the RAS definition, these automatic functions would be considered RAS. The identification of RAS is not dependent upon the specific hardware or platform utilized in the scheme.

Remedial Action Schemes (RAS) are unique and customized assemblages of protection and control equipment that vary in complexity and impact on the reliability of the Bulk Electric System (BES). To say the least, RAS assessment, design, testing, verification, and implementation is an extremely time-consuming and labor-burdened process.

SUMMARY

This document describes an example transformative Remedial Action Scheme (RAS) analyses and methodologies for a power system (e.g., BES), including methods of designing, reviewing, revising, testing, implementing, verifying, and/or validating a RAS, or combinations thereof. An improved RAS improves operation of the power system, such as improving performance, reliability, control, asset utilization, or combinations thereof. The example methodologies discussed will also be referred to as a tool—a transformative Remedial Action Scheme Tool (TRAST)— that may be applied to design, review, revise, test, implement, verify, or validate a power system RAS by way of the example methods described. In one example, TRAST provides an end-to-end solution for adaptively setting RAS parameters based on realistic and near real-time operation conditions to improve power system (grid) reliability and grid asset utilization, originating from utility data analysis, and evolves with the guidance of domain knowledge from power engineers, to significantly simplify and shorten the entire process.

In one example, innovative mathematical and advanced computing methods are described for adaptively setting RAS parameters or coefficients based on realistic and near real-time operation conditions. The example method identifies technology gaps, provides new algorithms to enhance the existing practice to determine the arming levels of RAS, and can be applied into system RAS analysis, validation, and improvement. An example method may use a high performance computing (HPC) platform for steady state and dynamic simulations considering massive contingencies and operating conditions, and may explore potential improvements introduced by advanced machine learning techniques and statistical data analytics.

Example methods integrate advanced algorithms in the system RAS analysis, and big data challenges are addressed through comprehensive system and industry analytics. HPC and cloud computing techniques may be implemented, power engineering domain knowledge is applied and improved, and industry ecosystems are leveraged.

An example method of designing, reviewing, revising, testing, implementing, verifying, or validating a RAS for a power system comprises obtaining a plurality of power flow cases associated with at least one power system; dynamically simulating the power flow cases to derive a RAS arming level; deriving or predicting a RAS coefficient using the RAS arming level; validating the RAS coefficient for RAS performance in the power system; and, adapting settings of the RAS based on the validated RAS coefficient for improving operation of the power system.

Another example method of designing, reviewing, revising, testing, implementing, verifying, or validating a RAS for a power system comprises receiving statistical data analysis relating to at least one power system; generating a plurality of power flow cases for optimal power flow in the power system; dynamically simulating the power flow cases to derive a RAS arming level; predicting a RAS coefficient using the RAS arming level and machine learning; validating the RAS coefficient for RAS performance in the power system; and, adapting settings of the RAS based on the validated RAS coefficient for improving operation of the power system.

BRIEF DESCRIPTION OF THE DRAWINGS

Examples of a transformative RAS analysis and methodology (e.g., TRAST) will now be described with reference to the accompanying drawings. Throughout the drawings, identical reference numbers designate similar, but not necessarily identical, elements.

DETAILED DESCRIPTION

Figure 1:
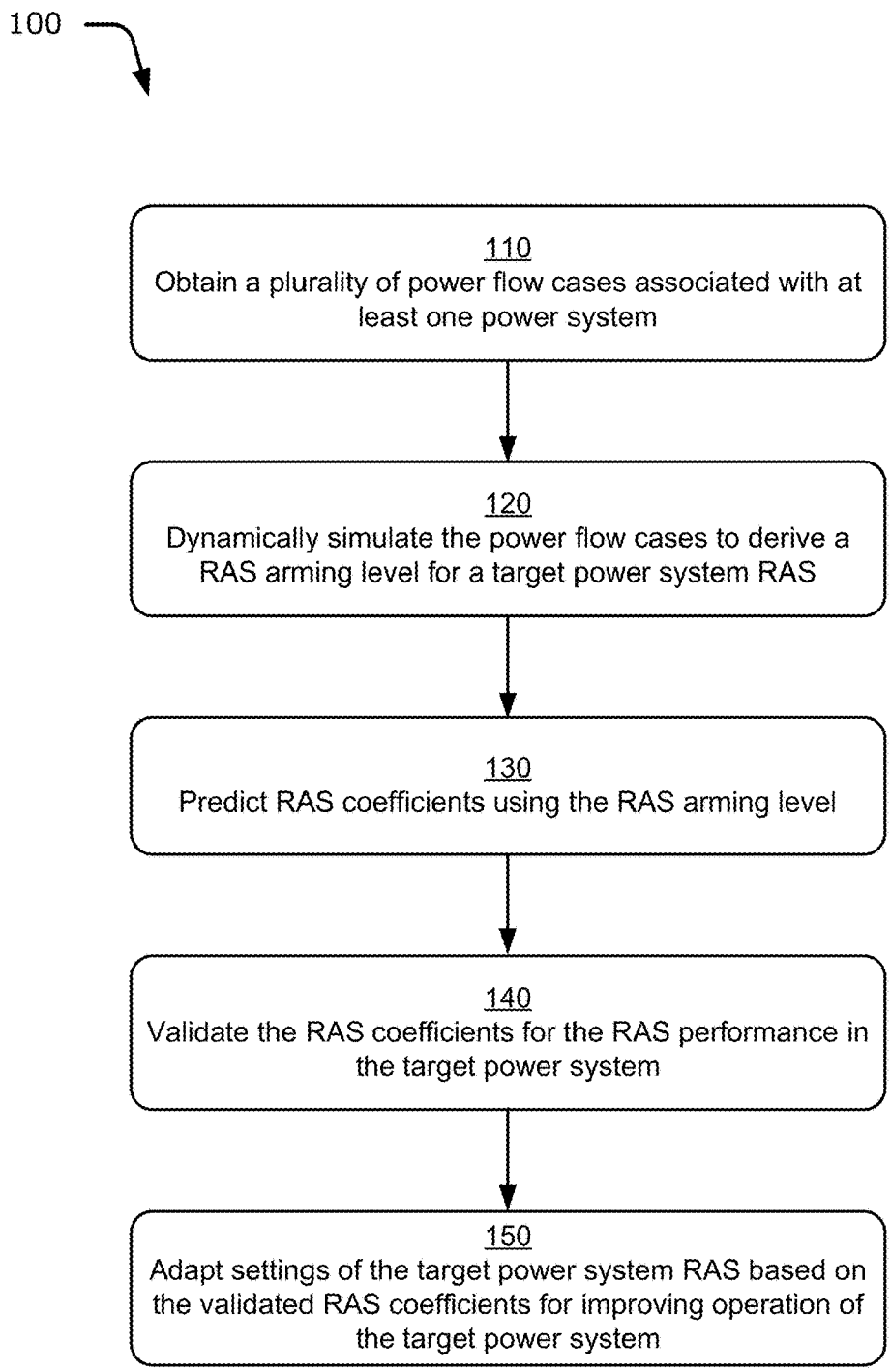
FIG. 1 is a flow chart illustrating high level operations performed by an example TRAST method.

FIG. 1 is a flow diagram showing an example high-level TRAST method 100 of designing, reviewing, revising, testing, implementing, verifying, or validating a remedial action scheme (RAS), or combinations thereof, for a target power system (or bulk electric systems, or BES). The terms designing, reviewing, revising, testing, implementing, verifying, or validating a RAS will be referred to herein as, or under the umbrella term of, "designing" for simplicity purposes.

The operations of method 100 may be embodied as programming instructions stored on a non-transitory, machine-readable (e.g., computer/processor-readable) medium, such as a RAM or ROM memory for execution in a computing device or devices. In some examples, implementing the operations of method 100 can be achieved by a processor reading and executing the programming instructions stored in the memory. In some examples, implementing the operations of method 100 can be achieved using an ASIC and/or other hardware components alone or in combination with programming instructions executable by a processor in a computing device or devices and/or any combination.

The example method 100 may include more than one implementation, and different implementations of method 100 may not employ every operation presented in the respective flow diagram of FIG. 1, or may employ additional steps not shown in FIG. 1. Therefore, while the operations of method 100 are presented in a particular order within the flow diagram, the order of their presentations is not intended to be a limitation as to the order in which the operations may actually be implemented, or as to whether all of the operations may be implemented. For example, one implementation of method 100 might be achieved through the performance of a number of initial operations, without performing one or more subsequent operations, while another implementation of method 100 might be achieved through the performance of all of the operations.

Referring now to method 100, a first step shown at block 110 comprises obtaining a plurality of power flow cases data associated with at least one power system. These cases may be obtained from existing utility services that manage specific power systems, and utility data analysis and mathematical models that reflect historical power flow data for those systems. In another example method, the cases may be obtained by receiving statistical data analysis relating to at least one power system, and then generating a plurality of power flow cases for optimal power flow in that or those power systems. In another example, the statistical data analysis comprises at least one of supervisory control and data acquisition (SCADA) data, power flow data extracted from state estimator (SE) cases, temporal factors, or combinations thereof. In a further example, generating a plurality of power flow cases comprises smart sampling the statistical data analysis. In yet another example, generating a plurality of power flow cases comprises iteratively applying an optimal power flow (OPF) analysis until the OPF does not solve.

A next step 120 comprises dynamically simulating the power flow cases to derive a RAS arming level for the target power system. The RAS arming level is defined by the critical system conditions for which RAS should be ready to take action when required, e.g., the minimum remedial action required for each contingency (when armed) and the maximum acceptable remedial action for each contingency (when pertinent). In another example method, dynamically simulating is performed using a high performance computing (HPC) platform considering contingencies and operating conditions of the power system.

Step 130 comprises predicting or deriving a RAS coefficient using the RAS arming level. In an example method, predicting the RAS coefficient is performed using machine-learning which may comprise, for example, neural network or multiple linear regression methodologies. In another example, predicting the RAS coefficient is performed considering further data, comprising, for example, at least one of tie-line flows, generation plant output, capacitor shunt compensation, series compensation, substation voltage, or combinations thereof.

Step 140 comprises validating the RAS coefficient for RAS performance in the target power system. In one example, validating the RAS coefficient for RAS performance in the power system includes validating via simulation relative to a plurality of power systems.

Finally, step 150 comprises adapting settings of the RAS based on the validated RAS coefficient for improving operation of the target power system. In one example, adapting settings of the RAS comprises at least one of adjusting generation (mega watt (MW), mega volt-ampere reactive (Mvar)), tripping generation, adjusting other sources, tripping other sources, adjusting load, tripping load, reconfiguring, or combinations thereof. Improving operation of the power system comprises at least one of improving performance, reliability, control, asset utilization, or combinations thereof. Also in one example, steps 110, 120, 130, and 140 are performed using an offline computer system or systems disconnected from the target (production) power system (grid), whereas step 150 is performed using a computer system(s) that is connected to or connectable to the production power system grid for improving operation of the grid.

This example TRAST provides an end-to-end solution for the RAS design, review, revise, test, implement, verify, and validate process. It originates from the utility data analysis and evolves with the guidance of domain knowledge from power engineers. The automatic/semi-automatic functionalities that are integrated in TRAST significantly simplify and shorten the RAS design and study process. On the other hand, continuous improvement and validation may also be realized based on the proposed evaluation methodology.

Statistical Analysis for Utility Data

Figure 2:
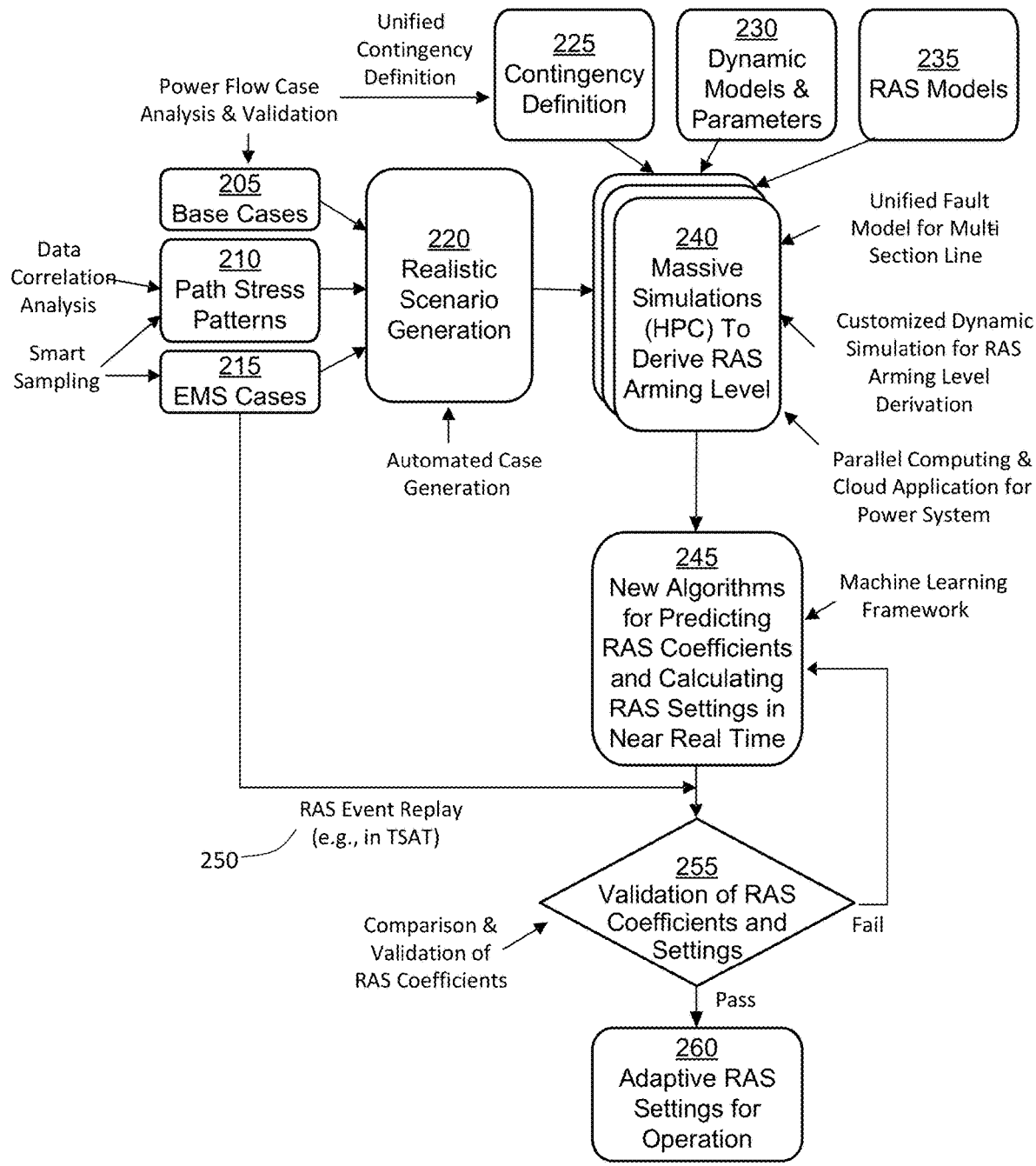
FIG. 2 is a block diagram overview of data-driven analytical functionalities in an example TRAST method.

FIG. 2 provides an overview of data-driven analytical functionalities in an example TRAST. In general, a full example of a Supervisory Control and Data Acquisition (SCADA) data set is preferred for enabling this example method and model, e.g., provided by existing utility company services or transmission system operators. The SCADA data set contains data essential for the existing system RAS model from those utilities. Historical arming levels are calculated based on existing RAS design using the processed SCADA data, and comparisons are performed between SCADA data and the corresponding power flow data extracted from state estimator (SE) cases used in Energy Management Systems (EMS) by the transmission system operators that provide an accurate representation of system state under fairly stable and well understood system operation. These SE cases assist in automated planning case generation, as well as RAS validation.

As depicted from a high level in one example, power flow case analysis and validation is performed using SCADA data comprising base cases 205, path stress patterns 210, or EMS cases 215, or a combination thereof. Data correlation analysis may be applied to the path stress patterns 210, and smart sampling may be applied to the path stress patterns 210 as well as the EMS cases 215. Results of these analyses are coordinated and provided to obtain a plurality of auto-generated power flow cases 220, representing a realistic scenario of cases for power system planning.

In this example method, obtaining the plurality of power flow cases comprises receiving statistical data analysis relating to at least one power system and generating a plurality of power flow cases 220 for optimal power flow in the power system. Alternatively, the power flow cases 220 may be obtained from existing utility company services or transmission system operators via previously applied mathematical models. Additionally, in one example, auto-generating a plurality of power flow cases comprises iteratively applying an optimal power flow (OPF) analysis until the OPF does not solve.

Power system contingencies obtained from multiple power systems (e.g., unified contingency definitions) may be collected to generate a model contingency definition 225. Dynamic models and parameters 230 are taken into account, as well as RAS models 235, each from comparable or referenced power systems. Then, each of the generated power flow cases 220, contingency definition 225, dynamic models and parameters 230, and RAS models 235, are processed through customized, dynamic massive simulations 240 to derive a RAS arming level. In this example embodiment, the massive simulations 240 are enabled using parallel computing and cloud applications, such as using a high performance computing (HPC) platform considering contingencies and operating conditions of the power system.

Next, responsive to the derived RAS arming level, new algorithms for predicting RAS coefficients and calculating RAS settings 245 in near real time are generated, and the RAS coefficient is predicted (derived) and RAS settings are calculated. In this example embodiment, a machine learning framework is leveraged for improved results as described more in detail subsequently herein. In another example, predicting the RAS coefficient is performed considering further data, wherein the further data comprises at least one of tie-line flows, generation plant output, capacitor shunt compensation, series compensation, substation voltage, or combinations thereof.

Another example responsive to EMS cases 215 may include leveraging an existing time-domain simulation tool 250 designed for comprehensive assessment of dynamic behavior of power systems and to calculate transient security limits under specified criteria, contingencies, and transfer conditions. One example tool is known as Transient Security Assessment Tool (TSAT) by PowerTech.

Next, the RAS coefficient and settings for performance are validated 255 in the RAS for the target power system. If they fail, the processes are repeated to predict a new RAS coefficient 245. In an example method, validating the RAS coefficient for RAS performance in the power system includes validating via simulation relative to a plurality of power systems.

If the RAS coefficients pass, then RAS system settings are adapted 260 based on the validated RAS coefficients for improving operation of the power system. In one example, adapting settings of the RAS comprises at least one of adjusting generation (MW and Mvar), tripping generation, adjusting other sources, tripping other sources, adjusting load, tripping load, reconfiguring, or combinations thereof. Additionally, in one example, improving operation of the power system comprises improving performance, reliability, control, asset utilization, or combinations thereof.

Stated differently, FIG. 2 provides a high level example methodology for statistical analysis and automatic processing of power systems raw data and time series analyses of power systems SCADA data using innovative statistical methods. Notable points include:

1. Pre-processing of the raw data files is preferred using these example design procedures.
2. Regression tree functionality has high-performance to predict RAS arming levels according to available compensation of path, power flow scenarios (S State), and season (see smart sampling discussion below).
3. Temporal factors, such as season and month of the year, have significant effects on SCADA data variability. It is recommended that these be included as supplementary features in training models using the SCADA data (see overview of data interface for TRAST below).
4. The system real power generation and the provided power flow are strongly correlated (see data interface for statistical analysis for utility data below). These two variables are important features for predicting available compensation of path using either logistic regression or decision trees (see data interface for smart sampling procedure below).
5. Latin hypercube sampling (LHS) for multivariate cross-correlated variables is an efficient and effective smart sampling method for exploring variability in the SCADA data (see data interface for automated power system planning case generation below).
6. The profiles of time series curves around certain system events from SCADA data match well the corresponding power flow data extracted from the SE cases.

Smart Sampling for Power System Planning Case Generation

A major objective of smart sampling (e.g., associated with path stress patterns 210 and EMS cases 215) in preparation to obtain or generate power flow cases 220, is to represent the probability distribution according to the original data using many fewer samples for each variable, all while honoring the data-dependency among the variables. The output of this smart sampling approach can then be used to guide the automated generation of power system planning cases. By applying the smart sampling method, the large volume of power flow cases required for dynamic simulations may be significantly decreased, while the main purpose of power system planning study for system RAS may still be fulfilled with confidence. Accordingly, the related computational power and engineering efforts are significantly decreased, and the whole planning study process may be accelerated in a relatively low-cost timeframe.

Figure 3:
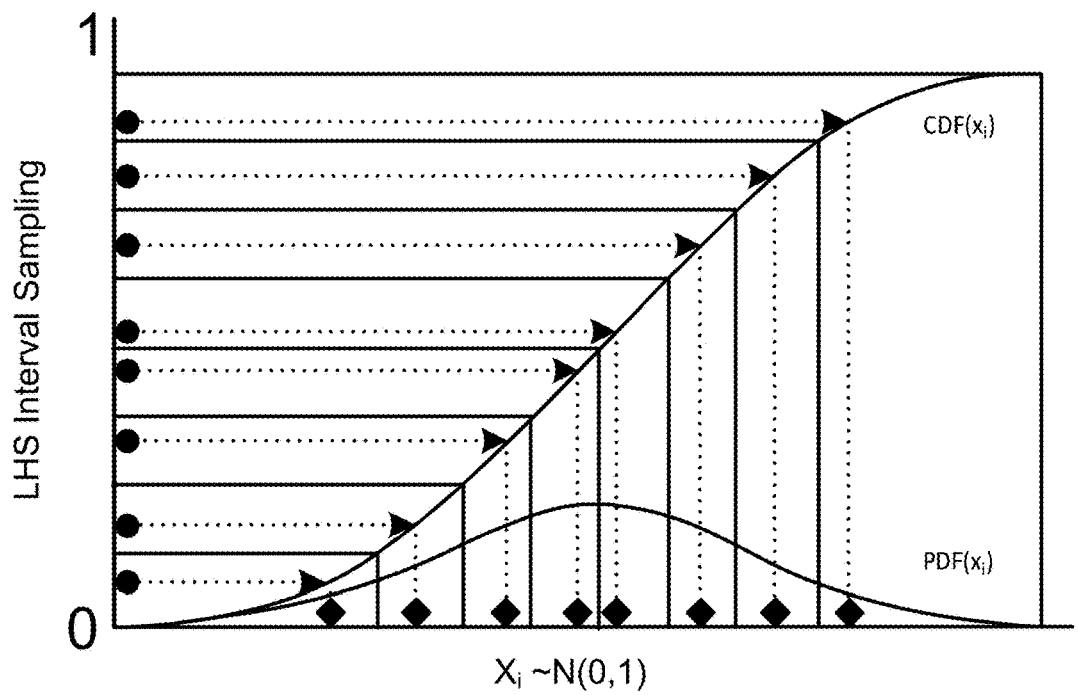
FIGS. 3, 4, and 5 are statistical data charts depicting example smart sampling for power system planning case generation.
Figure 4:
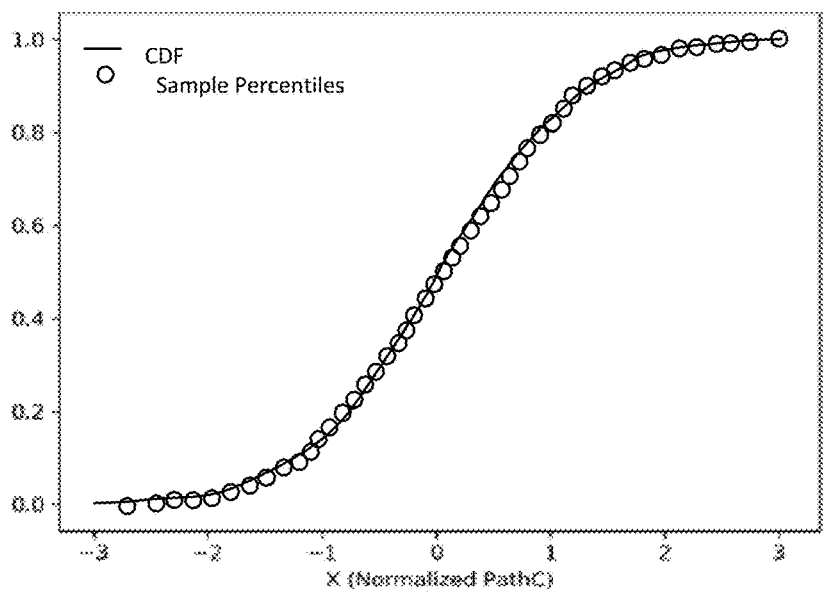
Figure 5:
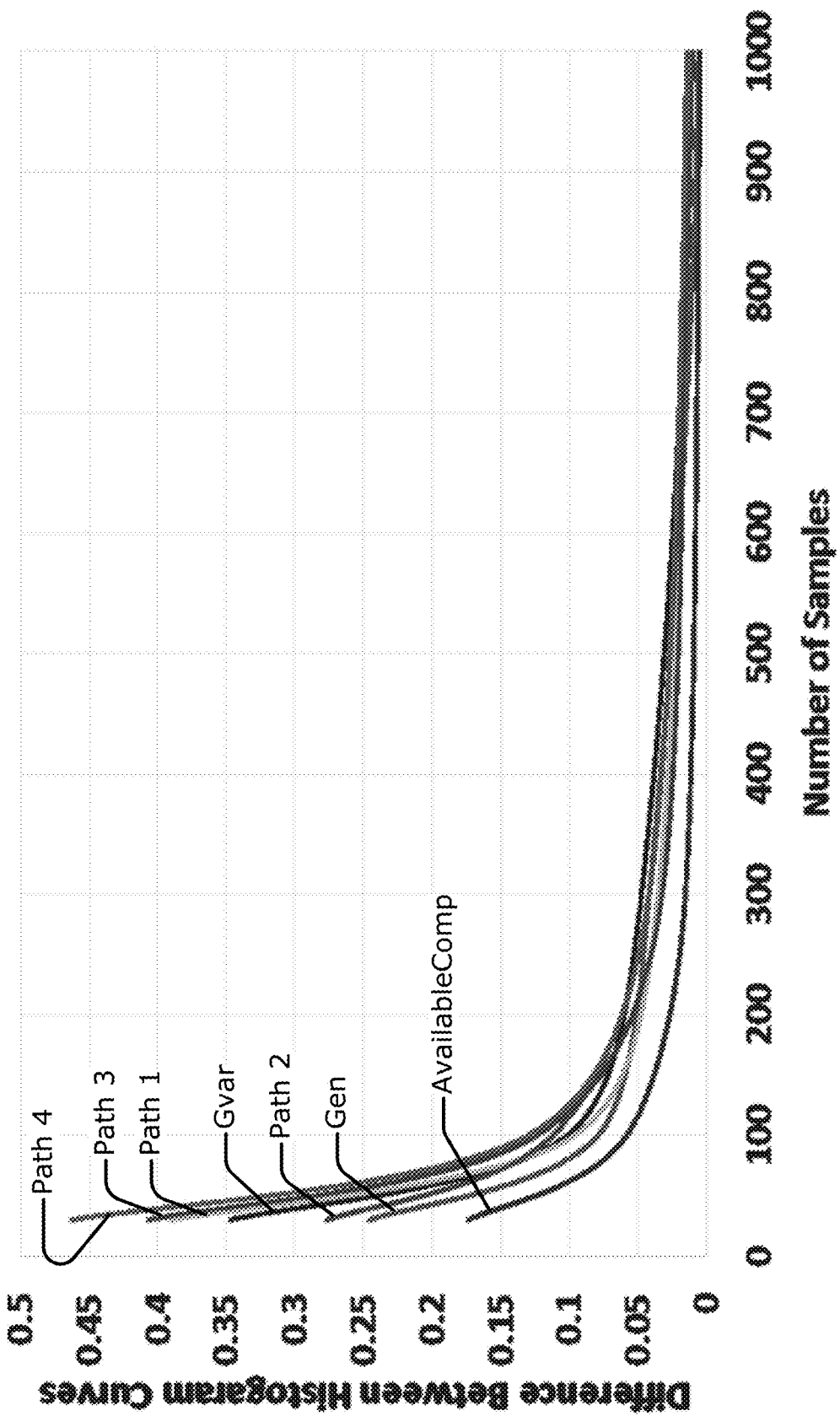

One example is to use a Latin Hypercube Sampling (LHS) design, such as created by a well-known pyDOE package, imported into Python to perform smart sampling on the provided SCADA data set. FIGS. 3-5 will be referred to in this discussion. The traditional LHS procedure in combination with example modifications under this disclosure is as follows:

1. Determine the number of independent variables to be sampled (NV).
2. Determine the number of sample points for each variables (NS).
3. Use pyDOE .lhs program to generate sampled points, which is an NS×NV matrix. All are scaled from 0 to 1, corresponding to the probability space. The criterion selected is "center," which centers the points within the sampling intervals.
4. For each variable, as shown in FIG. 3, the LHS sample points can be transformed from cumulative distributive function (CDF) (y-axis LHS Interval Sampling) to the probability distributive function (PDF) (x-axis) using percent point function (PPF) (inverse cumulative distribution) function. FIG. 3 therefore depicts transformation of LHS sampled points to a specific statistical distribution.
5. The corresponding sampled values in the physical space can be located using either PDF or CDF.

To overcome the necessity of PDFs in standard LHS method, an example of the disclosed procedure is to replace Steps 4 and 5 above. The LHS sample points can be mapped from a CDF to the percentiles calculated from real data points. For each sample, find the corresponding data value of a percentile value. FIG. 4 depicts this, which is a transformation of LHS sampled points from CDF to sample percentiles.

Finally, the modified procedure is flexible and general such that it may be adopted by any probability distribution, particularly when the number of observations is large. For example, FIG. 5 depicts the accuracy of samples (difference between original and sampled histogram curves) as the number of samples. In this example, this modified procedure samples seven SCADA variables and shows that a sample size of 365 may serve the balance between accuracy and computation burden.

Automated Power System Planning Case Generation

Figure 6:
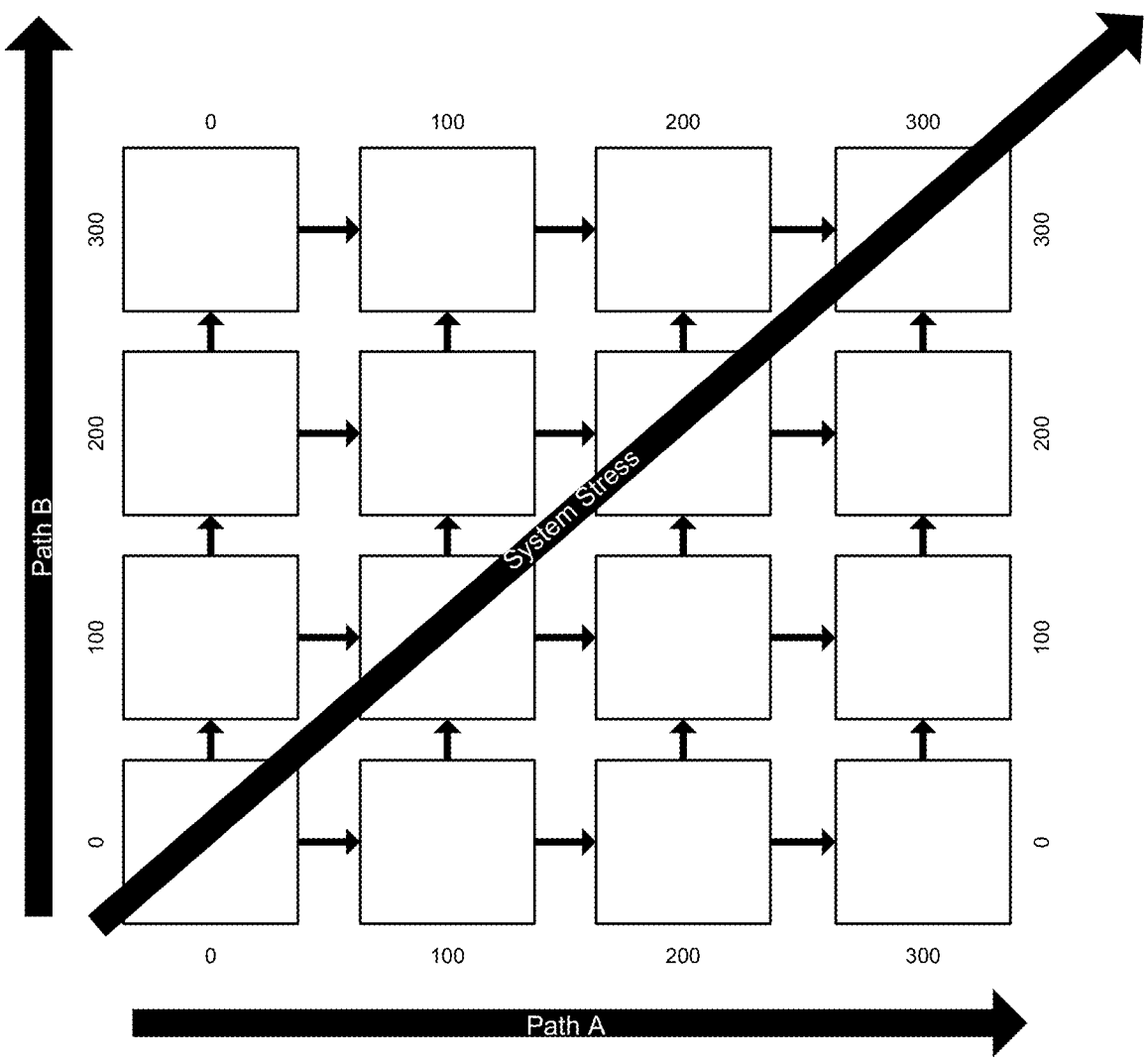
FIG. 6 is a chart depicting system stress pattern on different transmission paths.

It is a well-recognized challenge for power system planning engineers to create different power flow cases to represent different operation conditions considering generation and load variations as well as specific system stress conditions. FIG. 6 illustrates a system stress pattern that considers two transmission paths for automated power system planning case generation (see also FIG. 2, blocks 205, 210, 215, 220). To address this challenge and facilitate the RAS design and evaluation in one example, an optimal power flow (OPF)-based methodology is utilized.

Figure 7:
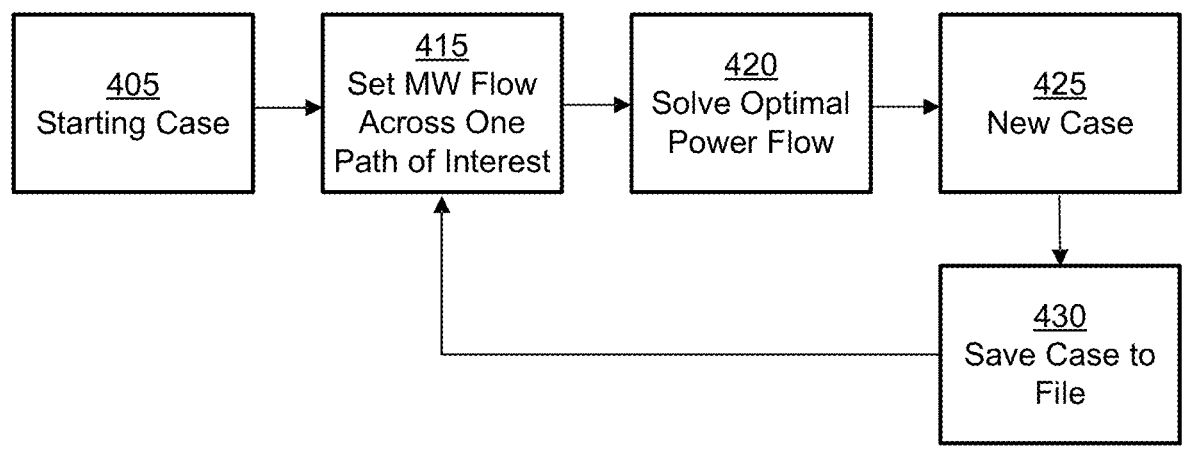
FIG. 7 is a block diagram of an example automated power system planning case generation.

OPF is applied to a case multiple times, each time incrementing a single path constraint by some value until the OPF does not solve. An abstract diagram depicting this process as an example automated power system planning case generation is shown in FIG. 7. As depicted, a starting case is obtained 405 and the MW flow across one path of interest is set 415. Then optimal power flow is solved 420 and a new case is generated 425. That new case is saved 430 and the process is repeated by incrementing a single path constraint and setting the MW flow across a path of interest 415.

All path flows in the defined paths of interest that are not being manipulated in the case creation process can be constrained to the value they are when the case begins. Users have the option to do this or let the paths float up to their rating limit (as defined in a given electricity coordinating council limit catalog). Moreover, for system RAS study, the system power plant is permitted to respond to the system conditions, e.g., system is set to respond via automatic generation control (AGC) option within the OPF.

In another example, the automated power system planning case generation may be implemented in a programming language that provides a numerical analysis environment in combination with an interactive power system simulation package designed to simulate high voltage power system operation. In one example, such a program known as MATLAB is used in coordination through the interface with SimAuto and the Powerworld Simulator, although similar analysis and simulator packages may also work. In this context, this script increases (or decreases) power transfer across a specified transmission path by using OPF to represent realistic operating conditions within the case. The output of this process is therefore a series of power flow cases with different loading, generation, and power transfer conditions to represent different and a diverse model of operating conditions on the power system. This also facilitates the testing and validation of power system control actions across a wide spectrum of feasible and credible operating conditions.

Figure 8:
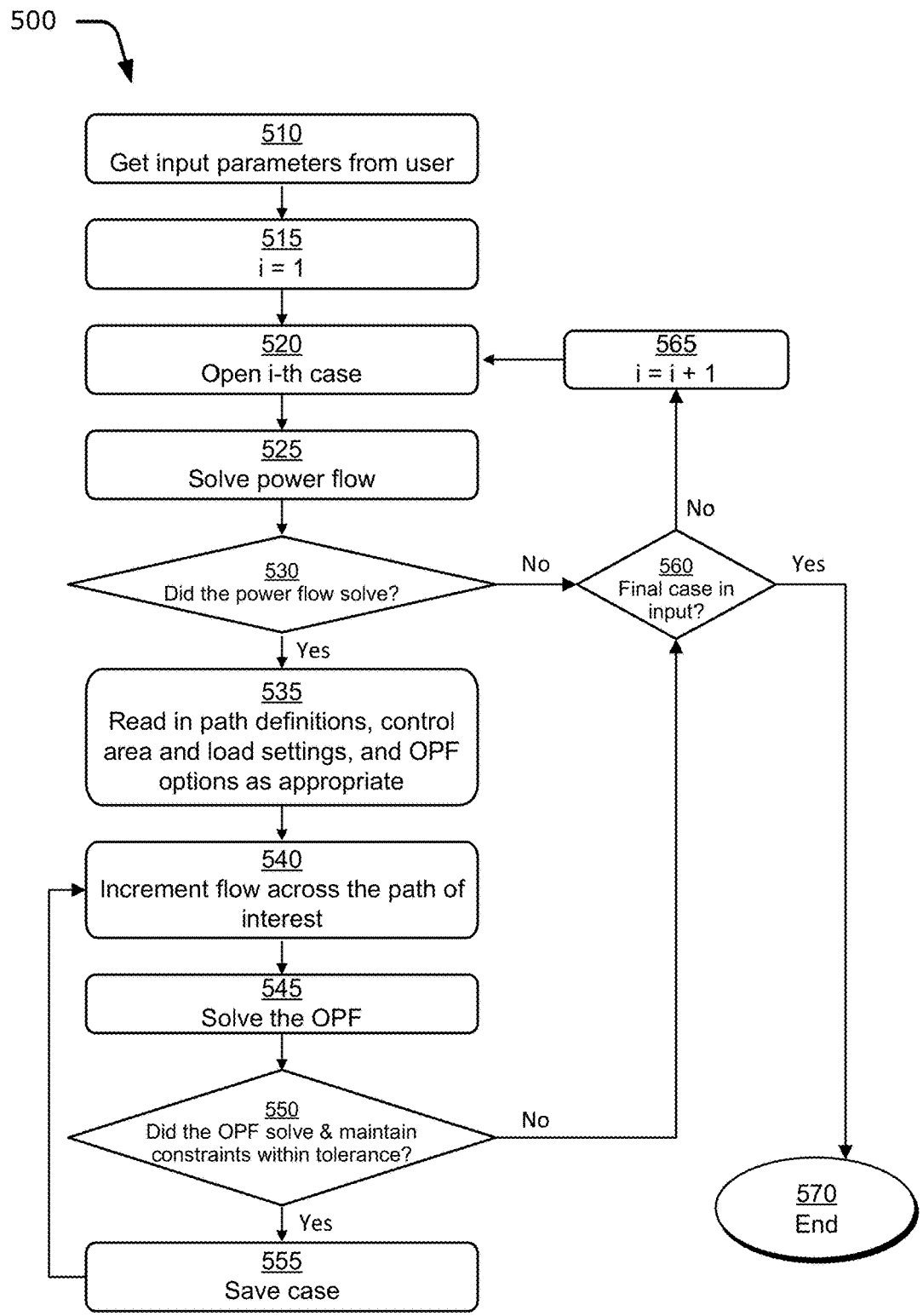
FIG. 8 is a flow diagram showing example logic for power flow case generation.

FIG. 8 is a flow diagram 500 showing the full logic of this example case generation process. First, input parameters are obtained 510, and a counter "i" is incremented 515. The "i-th" case 520 is opened and power flow is attempted to be solved 525. If the power flow solved 530, then read in path definitions, control area, load setting, and OPF options as appropriate 535. Then increment the flow across the path of interest 540 and solve the OPF 545. If the OPF solved and maintained constraints within tolerance 550, then save the case 555 and repeat the process by incrementing the flow across the path of interest 540.

If the power flow did not solve 530, and it is not the final case in the input directory 560, then increment the counter "i=i+1" 565 and open the incremented i-th case 520. Similarly, if the OPF did not solve and did not maintain constraints within tolerance 550, and it is not the final case in the input directory 560, then increment the counter "i=i+1" 565 and open the incremented i-th case 520. On the other hand, in either instance if we have reached the final input case in the input directory 560, then the case generation processing is done 570.

Customized Dynamic Simulation for RAS Arming Level Derivation

To be successful, the RAS design must ensure that the system meets the provided transmission planning criterion under all credible contingencies. More specifically, the criterion will be used to evaluate system performance in the large volume power system dynamic simulations and verify the system response in the substations and branches of interest. As one example, criterion may include: following fault clearing, the voltage at each applicable BES bus recover above 80%; the voltage at each applicable BES bus serving load must not drop below 70% of pre-contingency voltage for more than 30 cycles or remain below 80% of pre-contingency voltage for more than 2 seconds, etc. Again, the transmission planning criterion provided must be followed to evaluate the performance of the system RAS design.

In one example, an automated procedure is generated using Python scripts and an appropriate interface with a high-performance transmission planning and analysis software. For example, PSS/E is a popular commercial software provided by Siemens PTI that may be employed for this purpose.

Figure 9:
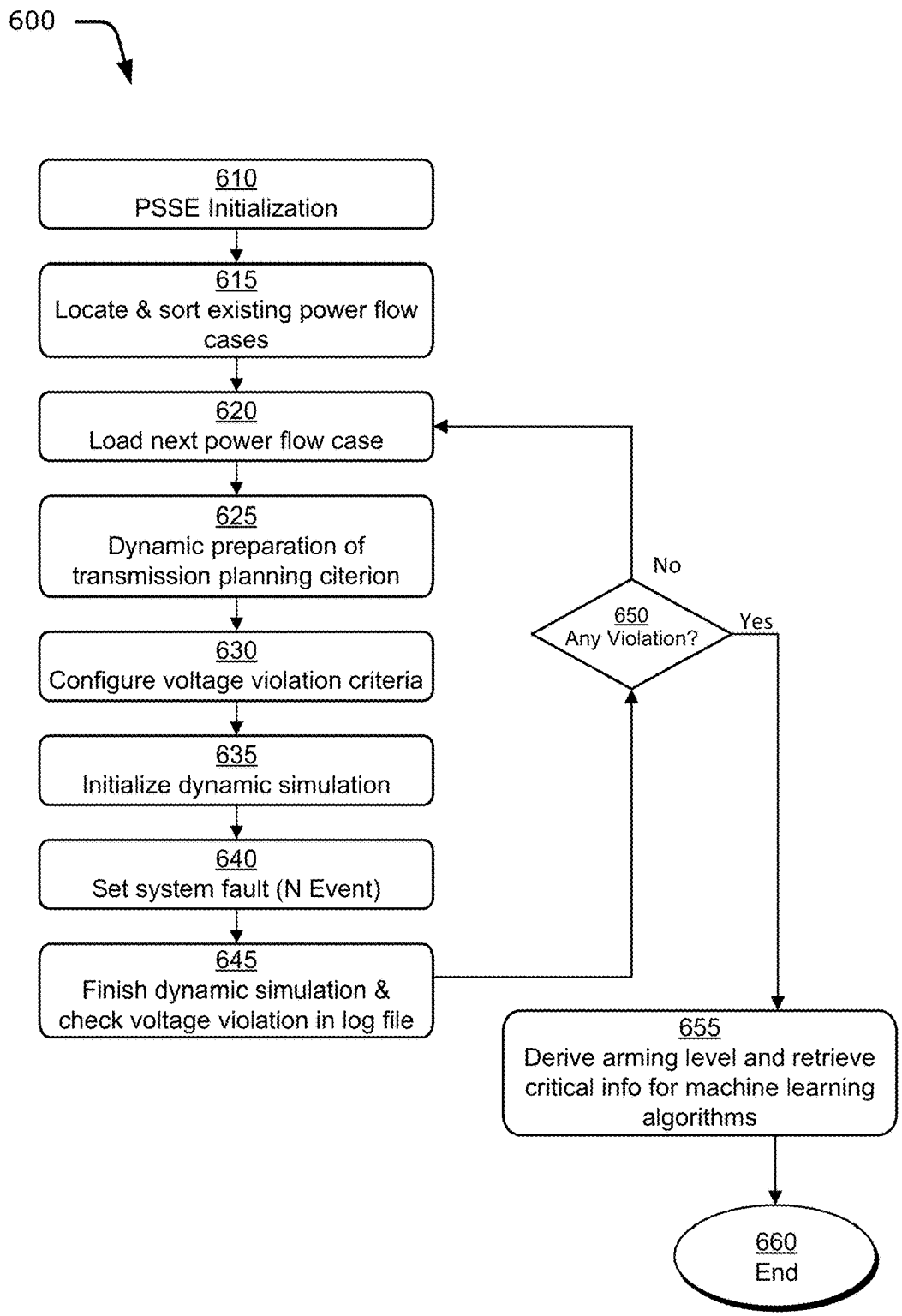
FIG. 9 is a flow diagram illustrating an example process of a customized power system dynamic simulation considering RAS arming level derivation.

FIG. 9 is an example flow diagram 600 illustrating this process of a customized power system dynamic simulation considering RAS arming level derivation. Upon initialization of the high-performance transmission planning and analysis software 610, power flow cases are located and sorted for evaluation 615, then a next case is loaded into the software 620. Then, the transmission planning criterion is dynamically prepared 625 and voltage violation criteria is configured 630. Subsequently the dynamic simulation is initialized 635, system fault or contingency (N Event) is set 640, and when the dynamic simulation finishes 645 any voltage violation is checked. If there is no voltage violation 650, then the next power flow case is loaded into the software 620. If there is a voltage violation 650, then the arming level is derived 655 and critical information is retrieved for the machine learning algorithms (discussed later). The process then ends 660.

Parallel Computing and Cloud Application for RAS Analysis

To ensure the performance of system RAS under different system operation conditions, one example design of system RAS logic considers hundreds of power flow scenarios (S States) in conjunction with many active system contingencies (N Events). Moreover, a proper pool of power flow planning cases is adopted to represent realistic system operation. This leads to a large volume of power system dynamic simulations to be performed in the system RAS analysis.

To accommodate this computational burden, an example strategy to alleviate the hardware and software requirements comprises separating out the burdens onto different computing platforms, e.g., overall script development, testing, and large-scale deployment is done in different computing platforms. For example:

1. Customized Python scripts may be developed and tested on a single personal laptop with, for example, a single core processor and memory.
2. A small-scale parallel computing test may be performed on a single laptop with, for example, an 8-core processor and memory.
3. The verified scripts may be deployed to a local, high-performance, parallel computing server with more computing cores, e.g., 32, to evaluate the scalability as well as script stability.
4. Once verified, the scripts may be deployed to a cloud services environment with a state-of-the-art HPC cluster, e.g., Microsoft Cloud, which is an economical and time-efficient solution for short-term, large-scale power system simulations.

This example TRAST method for parallel power system simulations in a high-performance server environment provides good scalability as well as significant speedup over traditional methods of RAS design.

Machine-Learning-Based RAS Coefficient Prediction

An example TRAST deploys a machine learning framework to update the RAS coefficients. A free software machine learning library for the Python programming language, known as Scikit-learn, is an example of a workable package to use for implementing TRAST because it features various classification, regression and clustering algorithms including support vector machines, random forests, gradient boosting, k-means and DBSCAN, and is designed to interoperate with Python numerical and scientific libraries.

In the prior art, RAS coefficients in existing system RAS designs are based on engineers' experience and manual tuning. As a result, the RAS design is very conservative and difficult to maintain. Therefore, a systematic, automated, and data-driven approach is more preferable when applicable, and this has been integrated in an example TRAST as one of the core functions.

Figure 10:
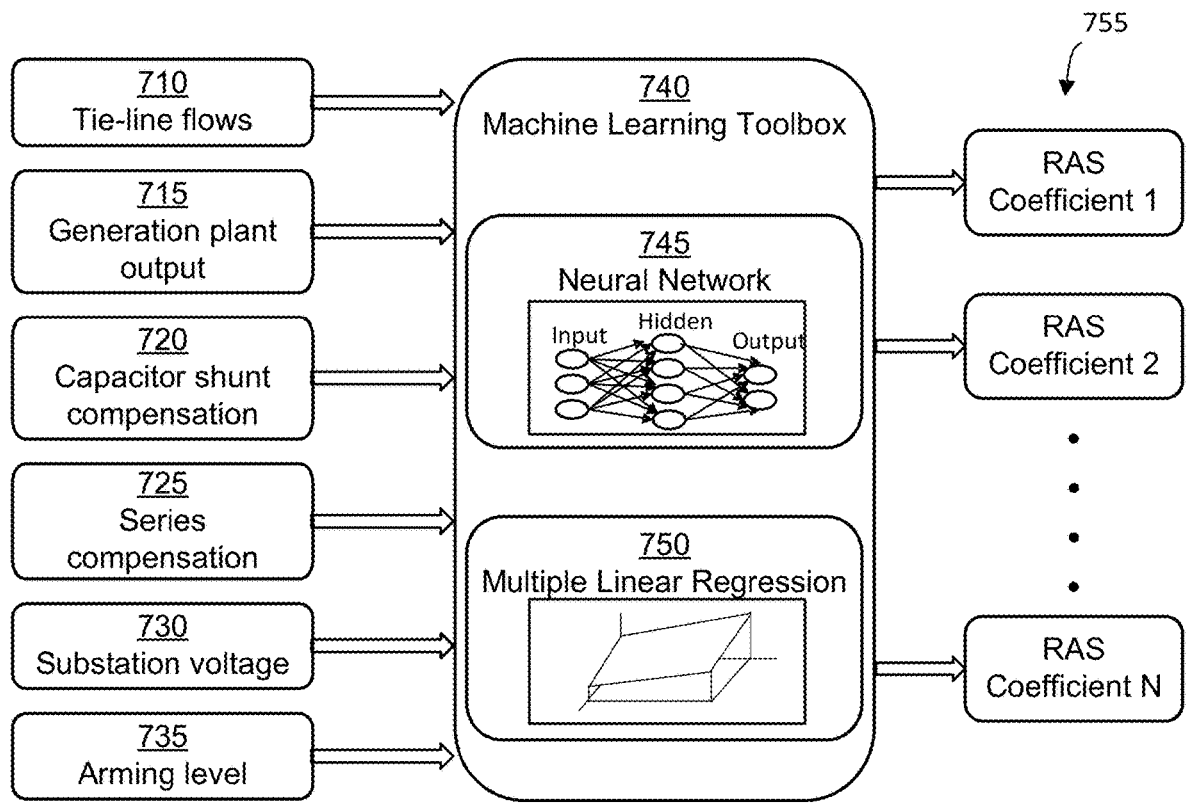
FIG. 10 is a block diagram illustrating an example machine learning framework for system RAS coefficient prediction or derivation.

FIG. 10 illustrates an example machine learning framework for system RAS coefficient derivation or prediction in TRAST. Example inputs that may be included in this framework are depicted, comprising tie-line flows 710, generation plant output 715, capacitor shunt compensation 720, series compensation 725, substation voltage 730, and arming level 735. Two example alternative solutions for the machine learning toolbox 740 are also shown—neural networks 745 and multiple linear regression 750—which are applied to derive the system RAS coefficients 755.

RAS Coefficient Comparison and Validation

One function of TRAST is to provide a transparent and reliable RAS validation and evaluation process. This can provide an objective way to not only validate the derived RAS coefficients 755, but also to evaluate the performance of the updated RAS, e.g., the performance of the updated system RAS before deploying the new coefficients to the utility production environment and control room.

Figure 11:
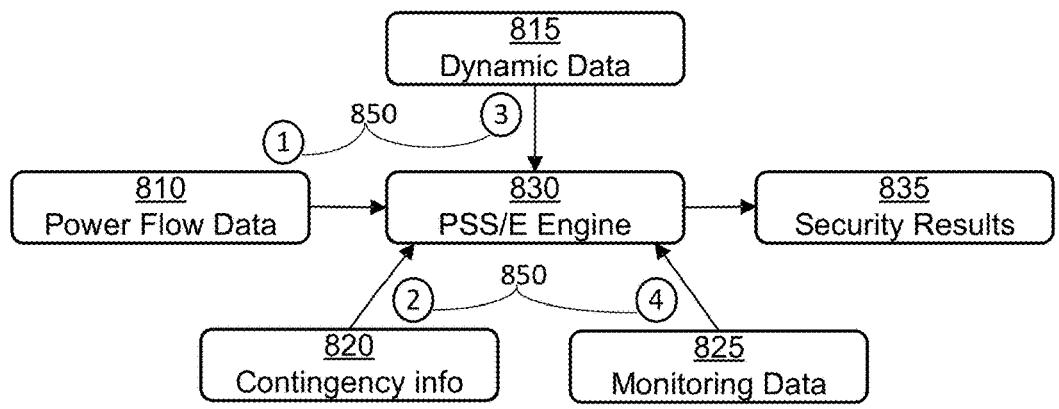
FIG. 11 is a block diagram illustrating an example RAS coefficient validation and evaluation.

FIG. 11 is a block diagram illustrating example cornerstones for this RAS validation and evaluation process. Power flow data 810, dynamic data 815, contingency information 820, and monitoring data 825 are all input into a high-performance transmission planning and analysis software engine (e.g., PSS/E engine) 830, and the output is the security results 835. The numbers 1-4 within the circle markers 850 are reference points discussed in connection with the timing of this process as depicted in FIG. 12.

Figure 12:
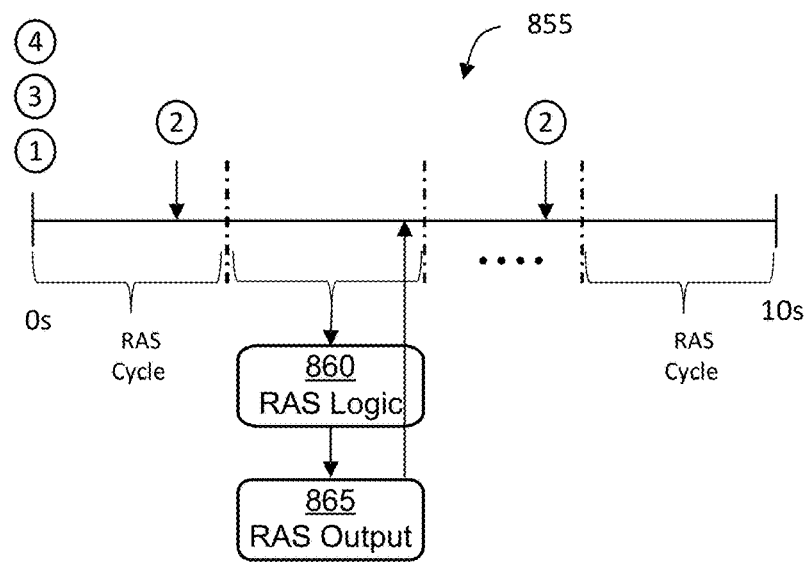
FIG. 12 illustrates a timing diagram for RAS coefficient validation.

FIG. 12 depicts an example process timeline 855 and time sequence for the RAS validation and evaluation process. The numbers 1-4 within the circle markers 850 are reference points discussed in connection with the data and events associated with FIG. 11. The timeline 855 in this snapshot runs from 0-10 seconds, and depicts how data and events associated with the power flow data 810 (circle marker 1), dynamic data 815 (circle marker 3), and monitoring data 825 (circle marker 4) are initially input into the PSS/E engine 830. Then, during the RAS cycle, contingency information 820 (circle marker 2) is input. The RAS logic is executed 860 and the RAS output 865 is then returned to the RAS processing.

Data INterface for TRAST

An example technology gap in the RAS industry is how a power system planning engineer should perform one comprehensive RAS design by leveraging traditional power system planning models and sensor measurement data, e.g., SCADA data and phasor measurement unit (PMU) data, from the utility control center, as well as related study procedures. TRAST clearly defines the data interface between each functionality within the RAS design and testing framework, resulting in an end-to-end solution for power engineers to rely on in the RAS design, study, and evaluation process. This section provides an overview of data interface for an example TRAST along with a detailed definition of data input and output for the integrated functions.

Traditional power system planning studies rely on power system planning cases that are provided by interconnection authorities or internal planning engineers. Usually, the total number of those planning study cases is limited and can only represent several power system operation conditions, such as "heavy summer," "harsh winter," and so forth. In contrast, system RAS requires a more comprehensive set of different power flow scenarios, as well as power system contingencies, which should be validated against a comprehensive pool of power system planning cases as input.

This traditional process leaves a gap in RAS analysis, as RAS requires intensive planning studies to ensure its performance under multiple power system operation conditions. More specifically, RAS is a power system control application based on power system planning studies. A RAS is generally implemented in a control room environment for daily operations and thus its impact to grid reliability and resilience may be significant.

Figure 13:
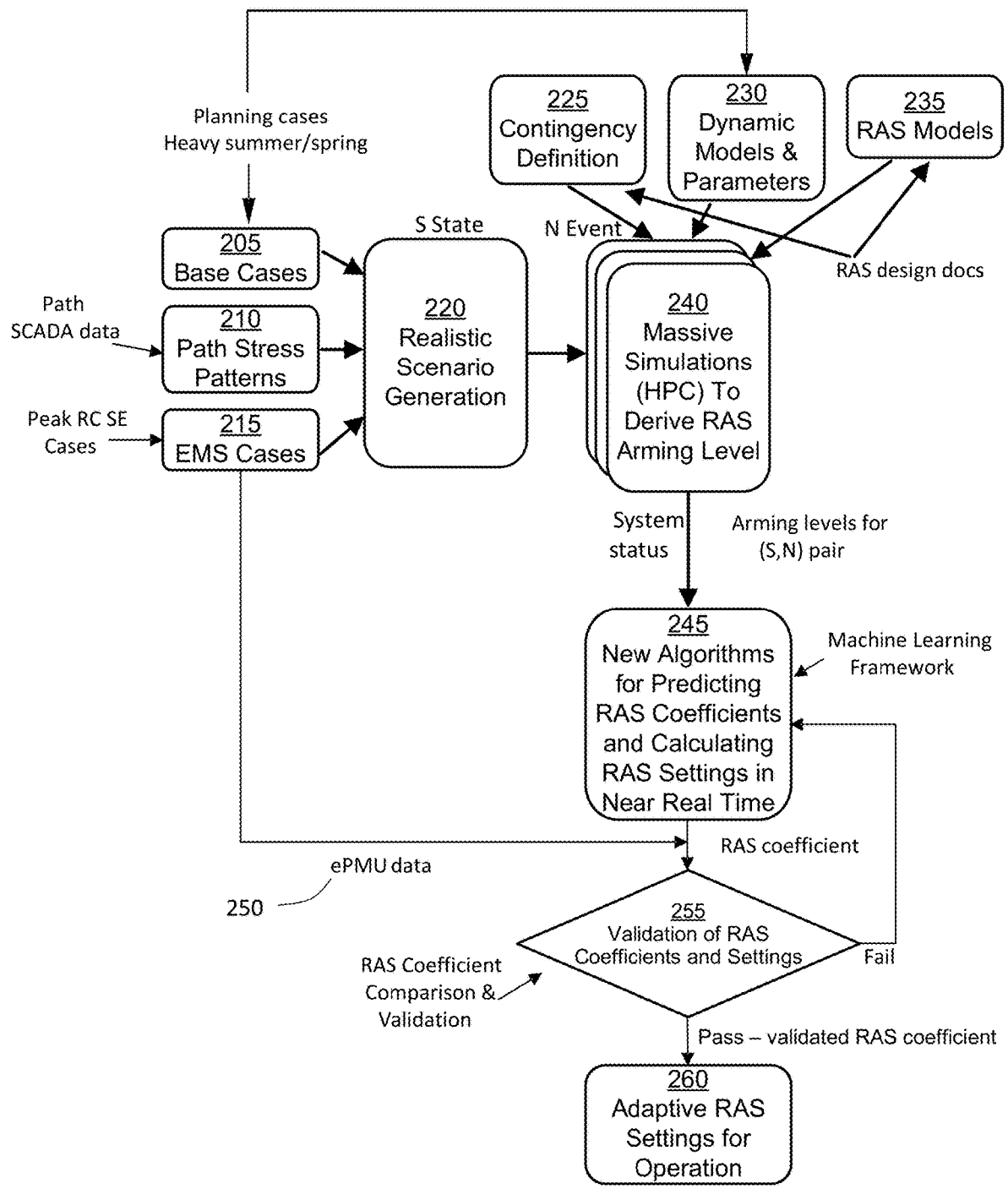
FIG. 13 is a block diagram overview of utility data integration in an example TRAST adaptive RAS setting framework.

In contrast, an example TRAST uses comprehensive historical operational data to ensure a solid and repeatable study procedure. In this context, FIG. 13 is a block diagram providing an overview of utility data integration in an adaptive RAS setting framework, e.g., TRAST, and its application for system RAS analysis.

Utility data usually include SCADA data and PMU data (e.g., path stress patterns 210 in FIG. 2), which are two main categories of power system data that are used in power system monitoring, operation, and control. In the statistical analysis, SCADA data from a utility company can be extracted through standard real-time data management software, and related software products that are used for data collection, historicizing, finding, analyzing, delivering, and visualizing data. An example software application is OSISoft PI DataLink from the PI System and database system. As an example, the extracted data from the utility company includes a tag name and data value, as well as corresponding timestamp. The data value can be a calculated value based on the original data in the database, e.g., the average over some period.

The data input for the statistical analysis may be, for example, either spreadsheet data (e.g., Microsoft Excel) or comma-separated value (CSV) files. The output for the statistical analysis is an analytical result, including but not limited to the mathematical relationship among different input variables and specific data pattern identified in the provided input data.

In an example embodiment, the smart sampling procedure (e.g., applied to path stress patterns 210 and EMS cases 215) requires a large amount of utility data (e.g., a whole year) for the power system measurements, especially those affecting the RAS design and operation. The input data format should follow the same data interface requirement for statistical analysis, while the output should be a list of sampled points, with each point representing one desired power system operating conditions. The total number of the sampled points should be determined through sufficiency analysis.

Once the smart sampling list for power flow planning cases has been generated, the power flow points contained in this list will be considered as the input of automated power system planning case generation. Another important input will be the initial interconnection planning cases. In an example system RAS study, we employ the WECC planning cases for the "heavy summer" and "light winter" scenarios.

Figure 14:
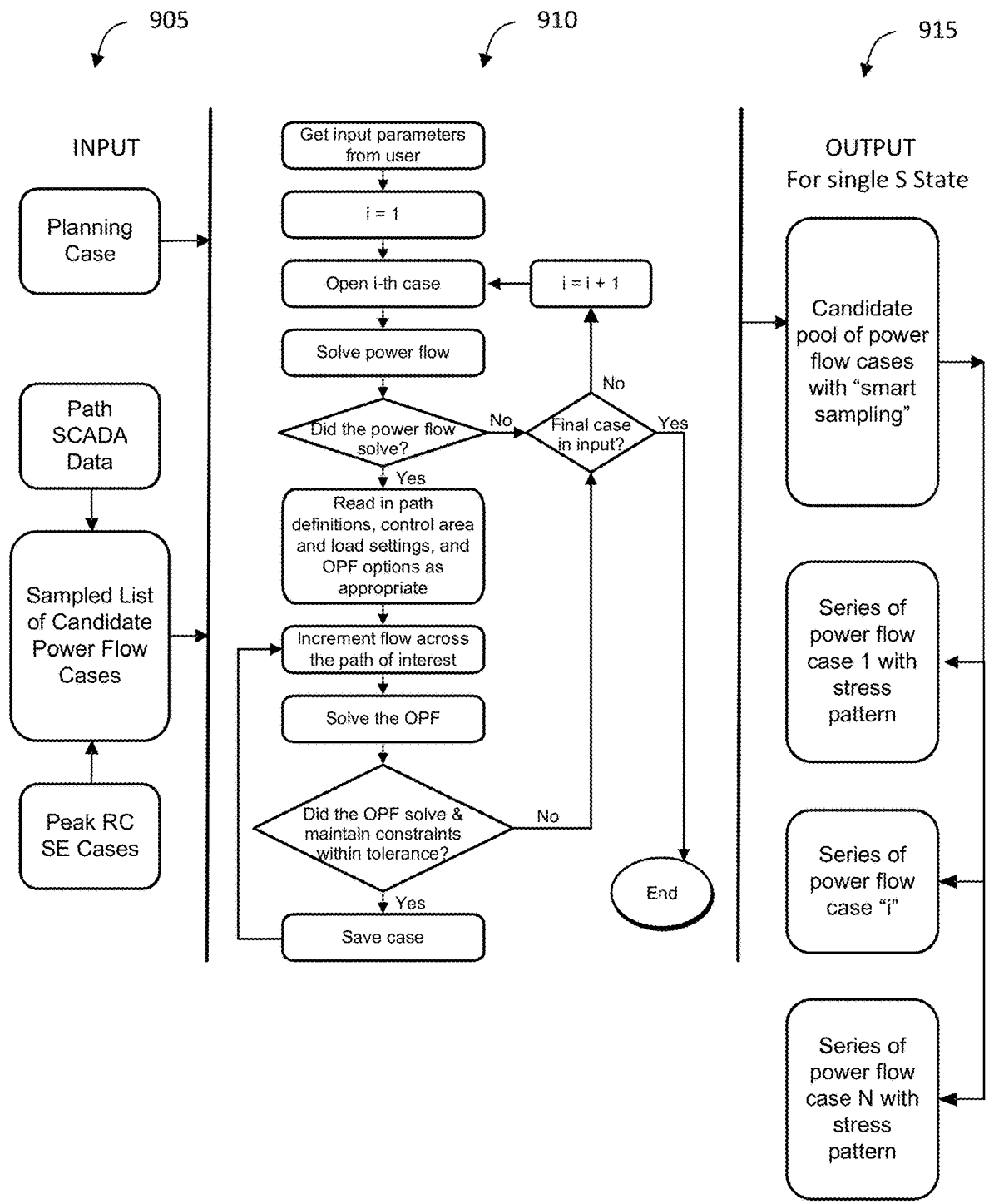
FIG. 14 is a flow diagram illustrating a data interface of automated power system planning case generation in an example TRAST.

FIG. 14 illustrates a data interface of automated power system planning case generation in an example TRAST. The flow of FIG. 14 comprises input data and cases shown at 905 on the left side of the figure, including path SCADA data, peak reliability coordinator (RC) SE cases, and a resulting sampled list of candidate power flow cases. Flow chart 910 (duplicating FIG. 8) illustrates the operations performed on the Input data 905. The output 915 for a single S state is illustrated on the right side of the figure, including the candidate pool of power flow cases with smart sampling, as well as the series of power flow cases with stress patterns from 1 to i and N.

The script performs the functionality of FIG. 14 on all cases saved in an input subdirectory and saves output cases to an output subdirectory. In an example operation, the script operates either on PowerWorld Binary (.pwb) files or on Siemens PTI PSS/E raw (.raw) files. The new generated cases can be saved as both .pwb files and as .raw files (e.g., PTI version 33).

Figure 15:
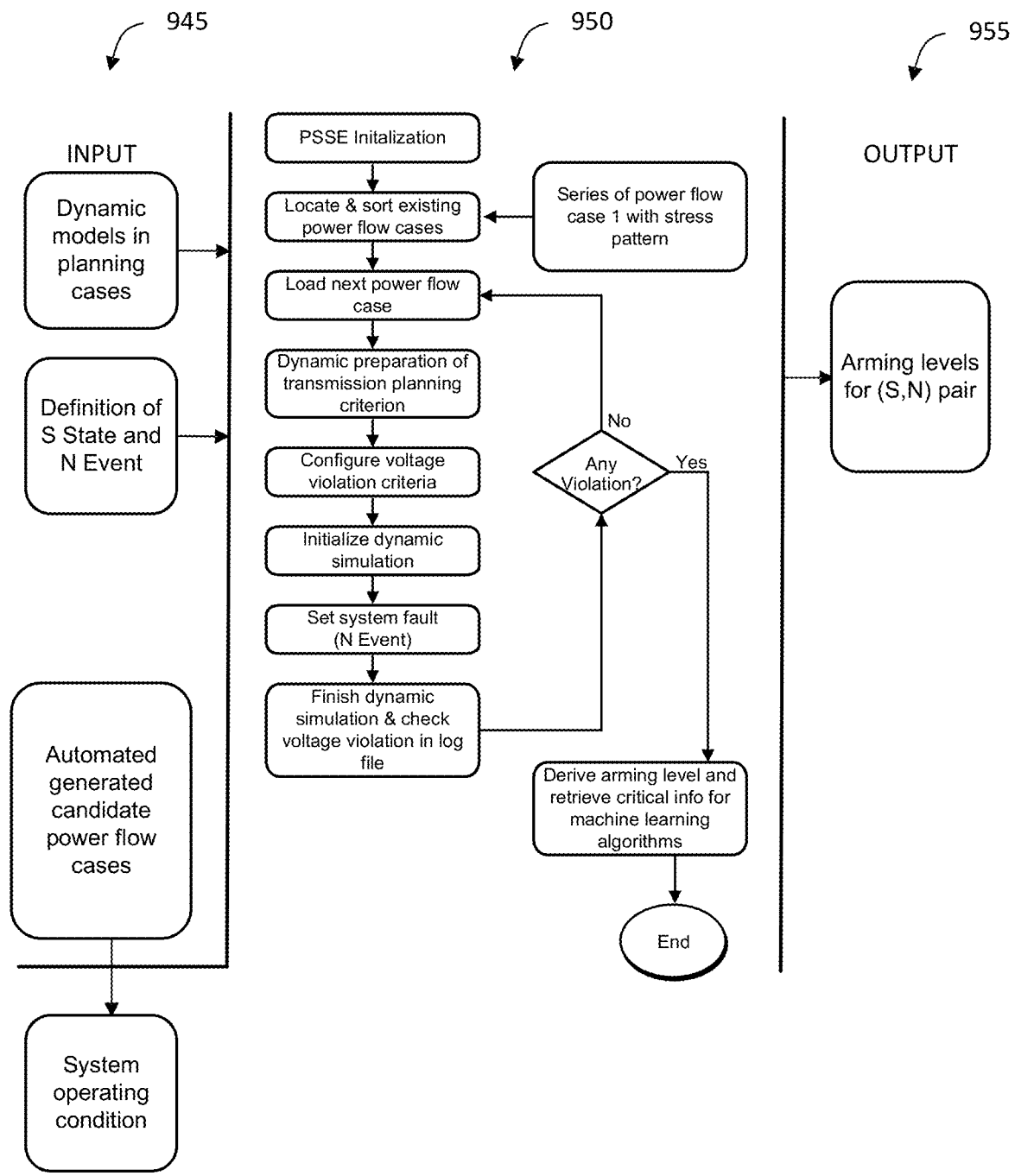
FIG. 15 is a flow diagram illustrating a data interface of customized dynamic simulations in an example TRAST.

FIG. 15 is a flow diagram illustrating a data interface of customized dynamic simulations in an example TRAST. The customized dynamic simulation relies heavily on the preceding automated power flow planning case generation process. Moreover, the dynamic models, including power plant models, load models, and protection models from a given dynamic model database are used in the customized dynamic simulation. Moreover, the definitions of S State and N Event for system RAS are included to derive the arming level for each S and N combination accordingly.

The flow of FIG. 15 comprises input data and cases shown at 945 on the left side of the figure, including dynamic models in planning cases, a definition of S State and N Event, and automated generated candidate power flow cases. A flow chart 950 (duplicating FIG. 9) illustrates the operations performed on the Input data 945. A series of power flow cases with stress patterns are also shown as input into flow chart 950. The output 955 comprises the arming levels for the (S,N) pair.

Figure 16:
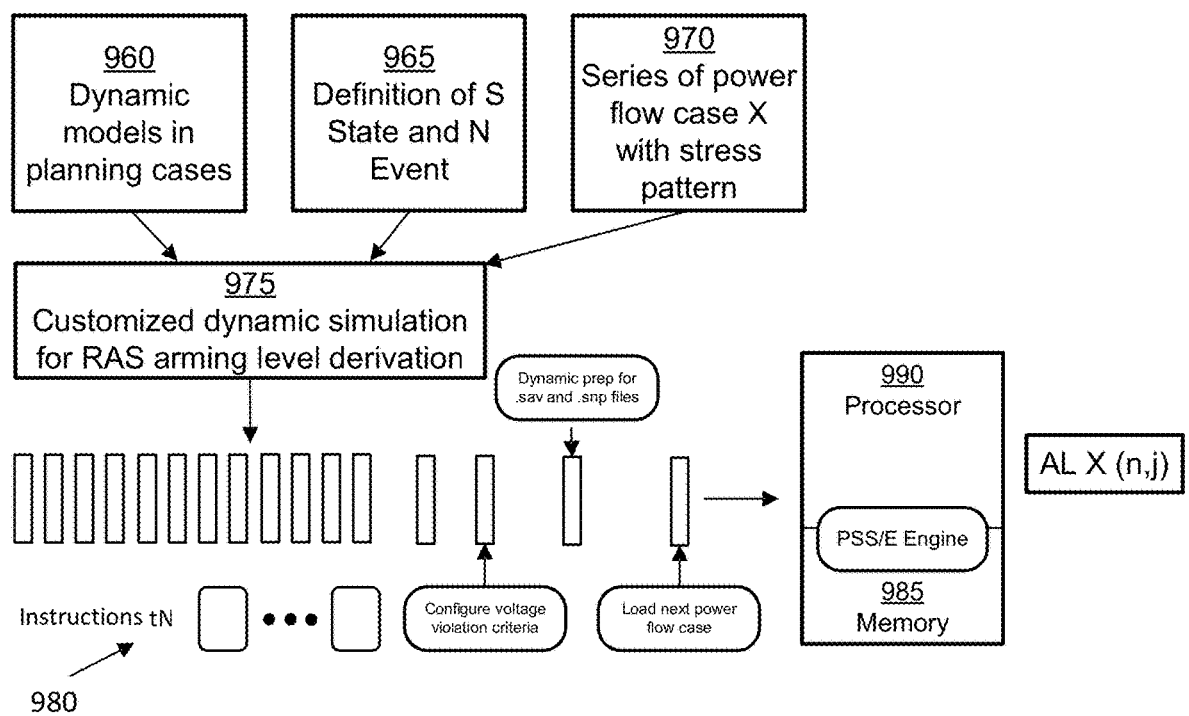
FIG. 16 is a block diagram illustrating a data deployment to cloud server cluster in an example TRAST.

FIG. 16 is a block diagram illustrating the data deployment to cloud server cluster in an example TRAST. Parallel computing in the cloud environment has proven to be an economical and time efficient solution for a large volume of power system dynamic simulations. In general, the data interface for this function is the same as customized dynamic simulation, while a Python script may deploy data from the local on-premise server to the cloud server cluster. More specifically in this example, multiple inputs are provided to the customized dynamic simulation for RAS arming level prediction derivation 975, including dynamic models in planning cases 960, definition of S State and N Event 965, as well as series of power flow cases with stress pattern 970. The results are fed to instructions 980 in a memory 985 and into computer processor 990 for execution. The instructions 980 comprise, for example, configure voltage violation criteria, load next power flow case, etc. Also in this example, PSS/E engine resides in memory 985 and processor 990 to execute on processor 990 and to process the instructions and data 980.

Regarding the data interface for machine-learning-based RAS coefficient prediction or derivation, we refer back to FIG. 10. For this function, in one example the input data is formatted into a two-dimensional size-mutable, potentially heterogeneous tabular data structure with labeled axes (rows and columns) where the data frame is a two-dimensional data structure, meaning the data is aligned in a tabular fashion in rows and columns. The Python Pandas Data Frame format is a known method of deploying this, and enables compliance with the previously discussed software machine learning library for the Python programming language known as Scikit-learn library. In this context, system operating conditions extracted from the generated power flow cases, along with the arming levels (S,N) pair derived from the customized dynamic simulation, are provided as input. The system operating conditions may comprise, as referenced in FIG. 10, data such as tie-line flows, generation plant output, capacitor shunt compensation, series compensation, and substation voltage. These inputs are provided into the machine learning toolbox 740, and the outputs are the RAS coefficients 755.

Finally, testing has confirmed that a simulation-based method is still favored for validating predicted or derived RAS coefficients for system RAS, as there is no good way to perform online testing in the production environment without another standalone RAS for offline testing. As such, an effective validation and evaluation process will be simulation-based, but with test cases that consider extreme operation conditions with randomly-selected power flow planning cases.

Figure 17:
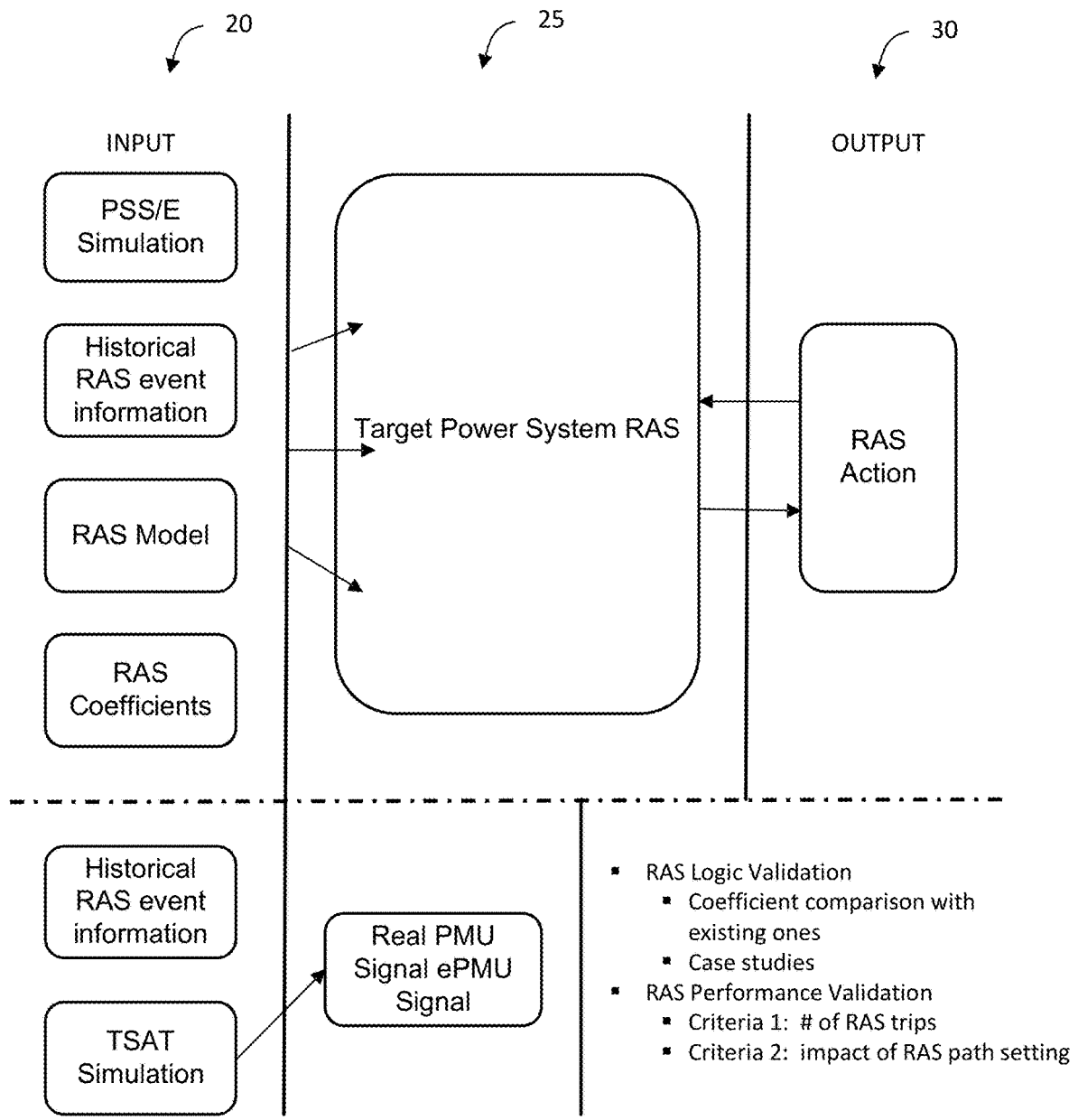
FIG. 17 is a block diagram illustrating the data interface for RAS validation and evaluation in an example TRAST.

FIG. 17 is a block diagram illustrating the data interface for RAS validation and evaluation in an example TRAST. As shown at 20, PSS/E simulations, historical RAS event information, RAS models, and RAS coefficients are input into a target power system simulation RAS 25. Additionally, historical RAS event information is considered, and a real PMU signal will be used for comparison with PSS/E simulation results. When no real PMU signal is available, the ePMU signal from TSAT simulation can be leveraged as reference for comparison with PSS/E simulation results. Ultimately, the target power system simulation RAS 25 outputs RAS actions 30, and those RAS actions are fed back into the target simulation RAS 25 as adapted settings based on the validated RAS coefficient for improving operation of the target power system. RAS logic validation includes comparing output RAS coefficients with existing coefficients and comparing case studies. Also in this example, RAS performance validation comprises criteria of the number of RAS trips, as well as the impact of RAS path setting.

While this disclosure has been described with respect to example embodiments outlined above, it is evident that alternatives, modifications and variations will be apparent to those skilled in the art. Accordingly, the described and depicted embodiments of the present disclosure are intended to be illustrative, not limiting, and the subject of the appended claims is not necessarily limited to the specific features or methods described herein.

What is claimed is:

1. A method of designing a remedial action scheme (RAS) for a power system, comprising:
  obtaining a plurality of power flow cases associated with at least one power system, the obtaining the plurality of power flow cases comprising:
    receiving statistical data analysis relating to the at least one power system; and
    generating a plurality of power flow cases for optimal power flow (OPF) in the at least one power system, the generating the plurality of power flow cases comprising:
      iteratively applying an OPF analysis until the OPF in the at least one power system does not solve;
  dynamically simulating the power flow cases to derive a RAS arming level;
  predicting a RAS coefficient using the RAS arming level;

validating the RAS coefficient for RAS performance in the power system; and, adapting settings of the RAS based on the validated RAS coefficient for improving operation of the power system.

2. The method of claim 1 wherein designing comprises at least one of reviewing, revising, testing, implementing, verifying, validating, or combinations thereof, the RAS for the power system.

3. The method of claim 1 wherein the dynamically simulating is performed using a high performance computing (HPC) platform considering contingencies and operating conditions of the power system, and wherein predicting the RAS coefficient is performed considering further data, wherein the further data comprises at least one of tie-line flows, generation plant output, capacitor shunt compensation, series compensation, substation voltage, or combinations thereof.

4. The method of claim 1 wherein the statistical data analysis comprises at least one of supervisory control and data acquisition (SCADA) data, power flow data extracted from state estimator (SE) cases, temporal factors, or combinations thereof.

5. The method of claim 1 wherein the generating the plurality of power flow cases comprises smart sampling the statistical data analysis.

6. The method of claim 1 wherein the dynamically simulating is performed using a high performance computing (HPC) platform considering contingencies and operating conditions of the power system, and wherein predicting the RAS coefficient is performed using machine-learning.

7. The method of claim 1 wherein the dynamically simulating is performed using a high performance computing (HPC) platform considering contingencies and operating conditions of the power system.

8. The method of claim 1 wherein predicting the RAS coefficient is performed using machine-learning.

9. The method of claim 1 wherein predicting the RAS coefficient is performed considering further data, wherein the further data comprises at least one of tie-line flows, generation plant output, capacitor shunt compensation, series compensation, substation voltage, or combinations thereof.

10. The method of claim 1 wherein validating the RAS coefficient for RAS performance in the power system includes validating via simulation relative to a plurality of power systems.

11. The method of claim 1 wherein adapting settings of the RAS comprises at least one of adjusting generation, tripping generation, adjusting other sources, tripping other sources, adjusting load, tripping load, reconfiguring, or combinations thereof.

12. The method of claim 1 wherein improving operation of the power system comprises at least one of improving performance, reliability, control, asset utilization, or combinations thereof.

13. The method of claim 1 wherein the statistical data analysis comprises at least one of supervisory control and data acquisition (SCADA) data, power flow data extracted from state estimator (SE) cases, temporal factors, or combinations thereof, and wherein the generating the plurality of power flow cases comprises smart sampling the statistical data analysis.

14. A system for designing a remedial action scheme (RAS) for a power system, comprising:

a memory device comprising data representative of power flow cases associated with at least one power system, the data comprising statistical data analysis relating to at least one power system;

at least one processor programmed with instructions to:
generate a plurality of power flow cases based on the statistical data analysis for optimal power flow (OPF) in the power system, the generation of a plurality of power flow cases comprising:
iteratively apply an OPF analysis until the OPF does not solve;
dynamically simulate the power flow cases to derive a RAS arming level;
predict a RAS coefficient using the RAS arming level;
validate the RAS coefficient for RAS performance in the power system; and,
adapt settings of the RAS based on the validated RAS coefficient for improving operation of the power system.

15. The system of claim 14 wherein designing comprises at least one of reviewing, revising, testing, implementing, verifying, validating, or combinations thereof, the RAS for the power system.

16. The system of claim 14 wherein the RAS coefficient is predicted using machine-learning.

17. The system of claim 14 wherein RAS coefficient is validated for RAS performance in the power system via simulation relative to a plurality of power systems.

18. The system of claim 14 wherein settings of the RAS are adapted comprises at least one of adjusting generation, tripping generation, adjusting other sources, tripping other sources, adjusting load, tripping load, reconfiguring, or combinations thereof.

19. The system of claim 14 wherein improving operation of the power system comprises at least one of improving performance, reliability, control, asset utilization, or combinations thereof.

20. A non-transitory machine-readable storage medium storing instructions that when executed by at least one processor cause the processor to perform operations comprising:

obtain a plurality of power flow cases for optimal power flow in a power system, the obtaining the plurality of power flow cases comprising:
receive statistical data analysis relating to the power system; and,
generate a plurality of power flow cases for optimal power flow (OPF) in the power system, the generation of the plurality of power flow cases comprising:
iteratively apply an OPF analysis until the OPF does not solve;
simulate the power flow cases to derive a RAS arming level;
predict a RAS coefficient using the RAS arming level;
validate the RAS coefficient for RAS performance in the power system; and,
adapt settings of the RAS based on the validated RAS coefficient for improving operation of the power system.

* * * * *